(12) United States Patent
Griffin

(10) Patent No.: US 7,792,332 B2
(45) Date of Patent: *Sep. 7, 2010

(54) METHOD AND SYSTEM OF TRANSITIVE MATCHING FOR OBJECT RECOGNITION, IN PARTICULAR FOR BIOMETRIC SEARCHES

(75) Inventor: Paul A Griffin, New York, NY (US)

(73) Assignee: Identix Incorporated, Minnetonka, MN (US)

( * ) Notice: Subject to any disclaimer, the term of this patent is extended or adjusted under 35 U.S.C. 154(b) by 1158 days.

This patent is subject to a terminal disclaimer.

(21) Appl. No.: 11/077,096

(22) Filed: Mar. 9, 2005

(65) Prior Publication Data

US 2005/0157909 A1    Jul. 21, 2005

Related U.S. Application Data

(63) Continuation of application No. 09/607,488, filed on Jun. 30, 2000, now Pat. No. 6,920,231.

(51) Int. Cl.
G06K 9/00    (2006.01)

(52) U.S. Cl. .................. 382/115; 382/118; 382/124

(58) Field of Classification Search ........... 382/115, 382/118, 124; 235/380; 340/5.1–5.12, 5.52–5.53, 340/5.8–5.86; 704/246, 273; 902/3, 4, 25; 351/204

See application file for complete search history.

(56) References Cited

OTHER PUBLICATIONS

U.S. Office Action dated Aug. 27, 2003 from U.S. Appl. No. 09/607,488.
U.S. Office Action dated Apr. 13, 2004 from U.S. Appl. No. 09/607,488.
Advisory Action dated Nov. 9, 2004 from U.S. Appl. No. 09/607,488.
US Notice of Allowance dated Feb. 8, 2005 from U.S. Appl. No. 09/607,488.
P. Jonathan Phillips, "Support Vector Machines Applied to Face Recognition"; *Advances in Neural Information Processing Systems 11*, M.J. Kearns, S.A. Solla, and D.A. Chon, MIT Press, 1999.
Penev et al.; Local Feature Analysis: A General Statistical Theory for Object Representation; *Network: Computation in Neural Systems 7* (1996), 477-500.
Lades et al.; "Distortion Invariant Object Recognition in the Dynamic Link Architecture", *IEEE Transactions on Computers*, (Mar. 1993).
Turk et al.; "Eigenfaces for Recognition", *Journal of Cognitive Neuroscience*, vol. 3, No. 1, (1991), 72-86.
Moghaddam et al.; "Beyond Eigenfaces: Probabilistic Matching for Face Recognition", *The 3rd International Conference on Automatic Face & Gesture Recognition, Nara, Japan* (Apr. 1998), 1-6.
Daniel L. Swets et al., "Using Discriminant Eigenfeatures for Image retrieval", *IEEE Transactions on Pattern Analysis and Machine Intelligence*, vol. 18, No. 8, pp. 831-838, Aug. 1996.
Baback Moghaddam et al., "Probabilistic Visual Learning for Object Representation", *IEEE Transactions on Pattern Analysis and Machine Intelligence*, vol. 19, No. 7, pp. 696-710, Jul. 1997.

*Primary Examiner*—Brian Q Le
(74) *Attorney, Agent, or Firm*—Weaver Austin Villeneuve & Sampson LLP

(57) ABSTRACT

A method and system of transitivity matching suitable for object recognition, and in particular biometric recognition such as face or fingerprint recognition, is provided. The invention provides a means for pre-encoding object match information from each set of raw object sample data or scores from an underlying recognition algorithm. A sample space is constructed and the raw scores are mapped into that space. Preferably, a recognition space is also constructed and the sample space scores are further mapped into the recognition space. Each space may be truncated to remove dispensable modes of that space. The distance between object data samples encoded in the sample space or the recognition space can be more rapidly determined, and the encoded data samples are also significantly compressed, compared to the raw scores.

19 Claims, 6 Drawing Sheets

METHOD AND SYSTEM OF TRANSITIVE MATCHING FOR OBJECT RECOGNITION, IN PARTICULAR FOR BIOMETRIC SEARCHES

This application is a continuation of U.S. patent application Ser. No. 09/607,488, filed Jun. 30, 2000 now U.S. Pat. No. 6,920,231.

FIELD OF INVENTION

The present invention relates to the fields of object and pattern recognition and more particularly to a method and system of recognizing or matching an object such as the biometric information of an individual.

BACKGROUND OF THE INVENTION

Statistical object recognition techniques are generally performed on sets of selectively measured data, referred to as features, to identify and distinguish objects or patterns of interest. Each collection of feature measurements may be considered a multi-dimensional vector, with each individual feature corresponding to one of the vector components. Each feature thereby forms an axis of a multi-dimensional feature space, and consequently any feature vector has a defined position in the feature space. The details of feature extraction depend on the application. One category of object recognition is biometric identification, where feature data representing the unique physical personal characteristics of an individual are used to recognize or verify the identity of a person. Commonly used biometric identifiers include face images and fingerprints, although other identifiers such as an individual's voice or hand geometry are also used.

In most biometric recognition techniques, before recognizing or matching the biometric information of an individual, a high dimensional biometric vector space is constructed. In biometric recognition, the raw biometric sample data obtained from individuals, corresponding for example to a face image or a fingerprint, is encoded into a biometric feature vector that "exists" in the biometric vector space. The similarity or nearness of a probe biometric vector in comparison to other previously encoded biometric vectors can then be measured, to determine a match and recognize an individual. Generally a match is made with the pre-encoded biometric vector that is most similar or nearest to the encoded biometric vector being tested or probed.

For example, in face recognition systems, a gallery of face images is first enrolled in the system and encoded for subsequent searching. A probe face is then obtained and compared with each coded face in the gallery, and the individual is recognized when a suitable match occurs. Because human faces and other biometric identifiers may display significant variation in appearance due, for instance, to changes in facial expression, orientation, facial hair, or lighting conditions, it is often difficult for face recognition systems to identify faces which exhibit considerable variation in appearance.

One well-known technique for face recognition uses eigenvector coding derived from Principal Components Analysis (PCA) to represent faces for recognition. In this photometric algorithm, the eigenvectors of the covariance matrix for an initial training set of face images are determined. The eigenvectors (which represent the principal components of the training set) act as a set of features which together characterize the variation between face images. Each face location contributes to a varying degree to each eigenvector, and the eigenvectors can be displayed as an "eigenface" which deviates from uniform grey where certain facial features differ from those of the training set faces. In this manner, the eigenfaces map the variation between faces, and each face can be represented in terms of a linear combination of the eigenfaces. Since the eigenfaces (and corresponding eigenvectors) account for a different amount of the variation among the face images depending on their eigenvalues, by using a subset of the eigenfaces having the largest eigenvalues, the most significant variation within the image set can be approximated with reduced dimensionality. The projection of an image on to this lower dimensional eigenspace yields an encoded vector. This projection, which is in effect an overlap image score, is then used for recognition by comparing the position or score of that encoded vector in eigenspace with the position or score of known individuals, and then determining which is nearest. Eigenface recognition techniques are described in more detail by Turk et al., "Eigenfaces for recognition", *Journal of Cognitive Neuroscience* 3(1):71-86(1991), the contents of which are incorporated herein by reference.

Several other methods and techniques for object, and more particularly biometric recognition, have been developed. For example, in addition to eigenfaces, prior art recognition systems may be based on: dynamic link matching as disclosed by Lades et al., "Distortion invariant object recognition in the dynamic link architecture", *IEEE Trans on Computers,* 42(3): 300-311 (March 1993), probabilistic matching as disclosed by Moghaddam et al., "Beyond Eigenfaces: Probabilistic Matching for face recognition", *FG '98,* pp. 30-35 (1998); support vectors as disclosed by Phillips, "Support Vector Machines applied to face recognition" *Advances in Neural Information Processing Systems* 11, eds: Jordan, Kearns, and Solla (1998); and local feature analysis as discussed by Penev et al., "Local Feature Analysis: A general statistical theory for object representation", *Network: Computation in Neural Systems* 7(3), 477-500 (1996) and as incorporated in the FaceIt® software developer kit available from Visionics Corporation of Jersey City, N.J. The contents of each of the references cited above is incorporated herein by reference.

Although the accuracy of these and other recognition methods is typically good, they are nevertheless generally unable to rapidly and efficiently carry out the required searches for determining a match in a large database of objects or individuals. In many applications, this is problematic since object or biometric searches need to be performed in minimal time, e.g. for a real-time recognition application. There is therefore a need for a system and method of object recognition capable of improving the speed of existing object or biometric recognition algorithms. It would also be desirable if the amount of data required to store or represent encoded biometric or object vectors could be reduced or compressed.

SUMMARY OF THE INVENTION

The present invention provides a method and system of transitivity matching suitable for object recognition, and in particular biometric recognition such as face or fingerprint recognition. The invention provides a highly efficient means for pre-encoding object match information from each set of raw object sample data, such as a face image or a fingerprint, to be stored in a database or to be checked against a database. With the transitive recognition method and system of the present invention, the time required for the recognition system to perform matching is dramatically reduced compared to that of an underlying object recognition algorithm. In addition, the size of the encoded object vectors or templates is also significantly reduced compared to the size of raw object vectors output by the underlying object recognition algorithm. For this purpose, the transitive recognition method and system of the present invention provides constructs a vector space in to which a data sample relating to an object is encoded, for recognition purposes. The construction of these new vector spaces and the encoding of object data in to these vector spaces enables the above described advantages of the present invention to be provided.

Thus, in a first aspect, the present invention provides a method of constructing a vector space in which a data sample relating to an object may be encoded. The method comprises providing a raw matching score between each of a plurality of basis sample elements and each of a plurality of data samples in a first sample database. The samples in the first sample database are out-of-sample with respect to the basis samples. The method also comprises constructing a sample space from the raw matching scores, with the sample space being defined by a basis set of sample space modes. Constructing the sample space may comprise generating a covariance matrix for the basis elements from the raw matching scores; and determining the eigenvectors and eigenvalues of the covariance matrix, the eigenvectors specifying the sample space modes. The method may also comprise generating a rotation matrix, based on the eigenvectors of the covariance matrix, the rotation matrix mapping raw matching scores into sample space scores.

In one embodiment, the sample space is also truncated by eliminating a subset of the sample space modes, the eliminated modes generally having the lowest eigenvalues. This may comprise determining a sample space score between each of a plurality of data samples in a second sample database and each of the sample space modes, the samples in the second sample database being out-of-sample with respect to the basis samples and the samples in the first sample database. A cut-off for eliminating a subset of sample space modes based on the distribution of said sample space scores for each of the sample space modes is selected, the distribution being indicative of how well a sample space mode is able to discriminate between samples.

Preferably, the method also comprises: determining a first common object sample space score between each of a plurality of data samples in a first common object sample database and each of the sample space modes; determining a second common object sample space score between each of a plurality of data samples in a second common object sample database and each of the sample space modes, the first and second common object sample databases each having a set of different samples for the same objects; and constructing a recognition space from the first common object sample space scores and the second common object sample space scores, the recognition space being defined by a basis set of recognition space modes. The sample space scores may be normalized with respect to each sample space mode before constructing the recognition space. Constructing the recognition space may comprise generating a second covariance matrix for the sample space modes from the first common object sample space scores and the second common object sample space scores; and determining the eigenvectors and eigenvalues of the second covariance matrix, the eigenvectors of the second covariance matrix specifying the recognition space modes. A second rotation matrix may then be generated, based on the eigenvectors of the second covariance matrix, the second rotation matrix mapping sample space scores into recognition space scores.

Preferably, the recognition space is truncated by eliminating a subset of the recognition space modes, the eliminated recognition space modes generally having the highest eigenvalues of the second covariance matrix. Truncating the recognition space may comprise determining a recognition space score between each of a plurality of data samples in a third sample database and each of the recognition space modes. The samples in the third sample database being of objects not sampled in the basis samples, the samples in the first sample database, the samples in the first common object database, or the samples in the second common object database. A cut-off for eliminating a subset of recognition space modes based on the distribution of said recognition space scores for each of the recognition space modes is then selected, the distribution being indicative of whether a recognition mode is generally unsuitable for recognizing different samples of the same object.

Alternatively, the recognition space may be constructed using linear discriminant analysis or non-linear discriminant analysis. Preferably, the plurality of basis sample elements are selected at random.

In another aspect the present invention provides a method of encoding a data sample relating to an object to enable the object to recognized. The sample space, truncated sample space, recognition space, and/or truncated recognition space are constructed as above. A raw matching score between the data sample and each of the plurality of basis sample elements is then provided. The raw matching scores of said data sample may then be mapped into sample space, truncated sample space, recognition space, and/or truncated recognition space scores.

In another aspect, the present invention provides a method of recognizing whether a probe data sample matches one of a plurality of known data samples comprising encoding the known data samples and encoding the probe data sample into sample space, truncated sample space, recognition space, or truncated recognition space. The distance between the sample space scores for the probe sample and each known sample in the sample space is measured, allowing which encoded known sample is nearest to the encoded probe sample in the sample space to be determined.

In another aspect, the present invention provides, for use in object recognition, a space construction and encoding system comprising: a sample space construction module for receiving a data sample relating to an object to be encoded, a plurality of basis sample elements, and plurality of data samples in a first sample database. The samples in the first sample database are out-of-sample with respect to the basis samples. The sample space construction module provides a raw matching score between each basis element and each of the plurality of data samples in the first sample database, and constructs a sample space from the raw matching scores, the sample space being defined by a basis set of sample space modes.

The system preferably also includes a recognition space construction module for receiving a plurality of data samples in a first common object sample database and plurality of data samples in a second common object sample database. The first and second common object sample databases each have a set of different samples for the same objects. The recognition space construction module determines a first common object sample space score between each of the plurality of data samples in the first common object sample database and each of the sample space modes and further determines a second common object sample space score between each of the plurality of data samples in the second common object sample database and each of the sample space modes. The recognition space construction module then constructs a recognition space from the first common object sample space scores and the second common object sample space scores, the recognition space being defined by a basis set of recognition space modes. The sample space scores may be normalized with respect to each sample space mode before construction the recognition space. The plurality of basis sample elements are preferably selected at random.

The system also preferably includes a sample space truncation module for truncating the sample space by eliminating a subset of the sample space modes, and a recognition space truncation module truncating the recognition space by eliminating a subset of the recognition space modes.

The objects may be persons, the data samples may represent faces of the persons, and the method may be used to perform face recognition. Alternatively, the objects may be persons, the data samples may represent fingerprints of the persons, and the method may be used to perform fingerprint recognition.

BRIEF DESCRIPTION OF THE DRAWINGS

The objects and advantages of the present invention will be better understood and more readily apparent when considered in conjunction with the following detailed description and accompanying drawings which illustrate, by way of example, preferred embodiments of the invention and in which.

DETAILED DESCRIPTION OF PREFERRED EMBODIMENTS

Although the description which follows relates primarily to biometric recognition techniques such as face or fingerprint recognition, it will be appreciated that the transitive recognition method and system of the present invention may be generally extended to recognition of other types of objects or patterns.

In biometric recognition, the comparison of data for a number of biometric identifiers does not return a Boolean (true/false) matching score when one data sample set is compared against another. Instead, the recognition algorithm returns an overlap or distance score, S, based on the notion of nearness or similarity. This is the case for face and fingerprint recognition systems, but is also commonplace in other types of object and pattern recognition systems. Since biometric scores obey a transitive property, described below, a score comparing the biometrics of different individuals may contain relevant and meaningful match information even though the individuals do not represent a match.

Figure 1:
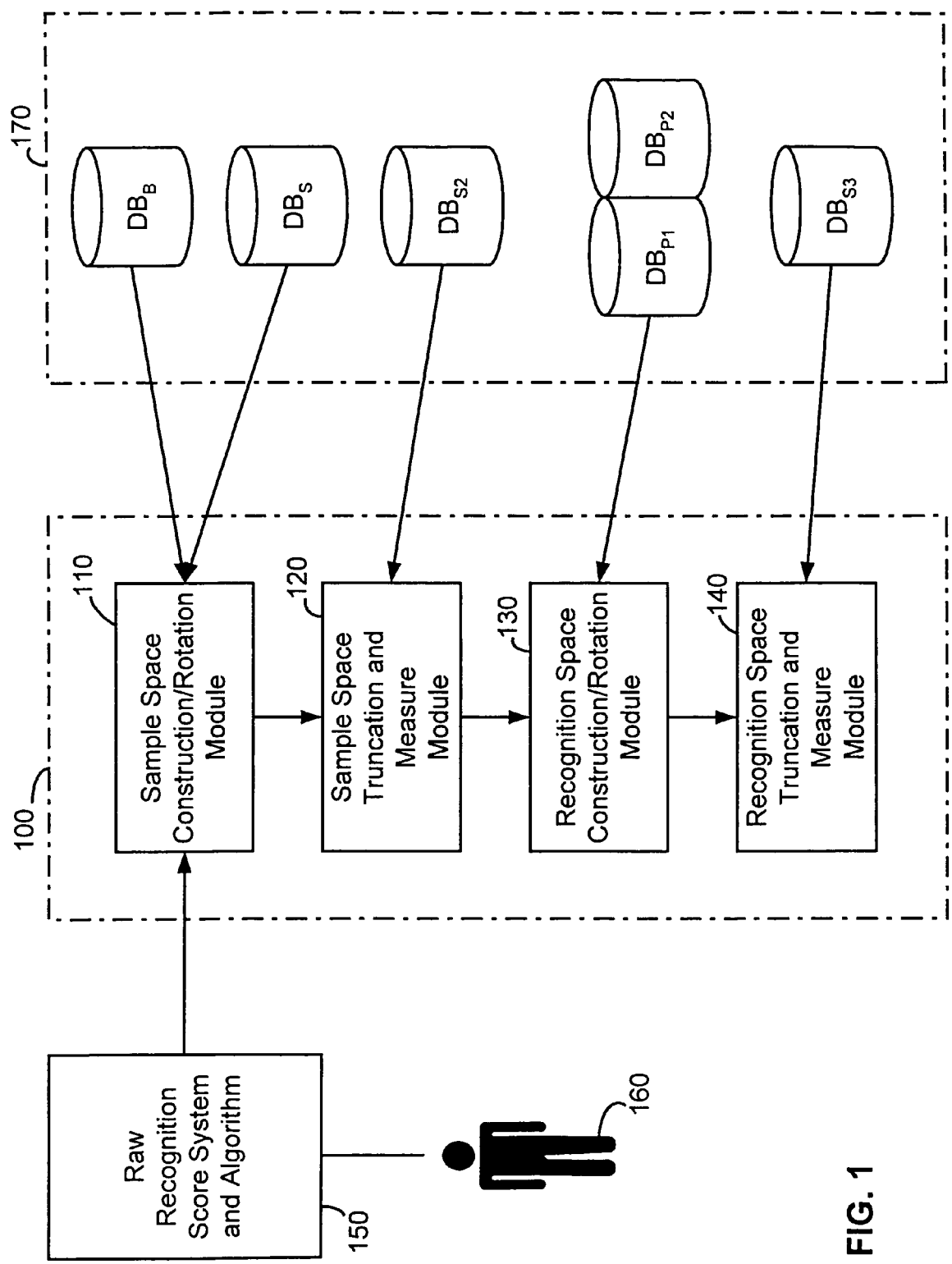
FIG. 1 is a block diagram of a preferred embodiment of the transitive recognition system of the present invention.

FIG. 1 is a block diagram illustrating how a transitive recognition system 100 of the present invention may be used with an underlying object or biometric recognition system 150 to improve the speed and efficiency of recognition matching. Conceptually, transitive recognition system 100 preferably includes four main software modules: a sample space construction and score rotation module 110, a sample space truncation and measure module 120, a recognition space construction and score rotation module 130, and a recognition space truncation and measure module 140. During operation, these modules use certain object or biometric sample databases 170, as shown in FIG. 1 and described in detail below. System 100 of the present invention exploits the transitive property described above to provide much faster and more efficient recognition and matching than that available with the underlying recognition system and algorithm 150 alone. In effect, the underlying recognition algorithm 150 generates "raw" scores that act as inputs to transitive system 100. The underlying or raw recognition system 150 may use any suitable recognition algorithm for generating raw matching scores and may be based, for example, on eigenface, dynamic link matching, probabilistic matching, or support vector techniques as referenced above. For example, recognition system 150 may capture sample biometric data from an individual 160 generate a raw score based on that sample data.

Figure 2A:
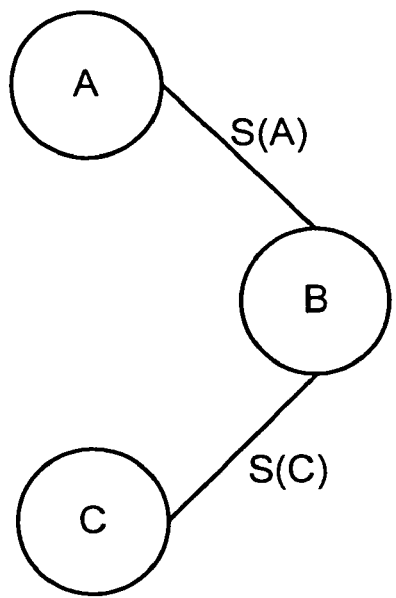
FIGS. 2A-2B are diagrams illustrating how the transitive property is used in the transitive recognition method and system of the present invention.
Figure 2B:
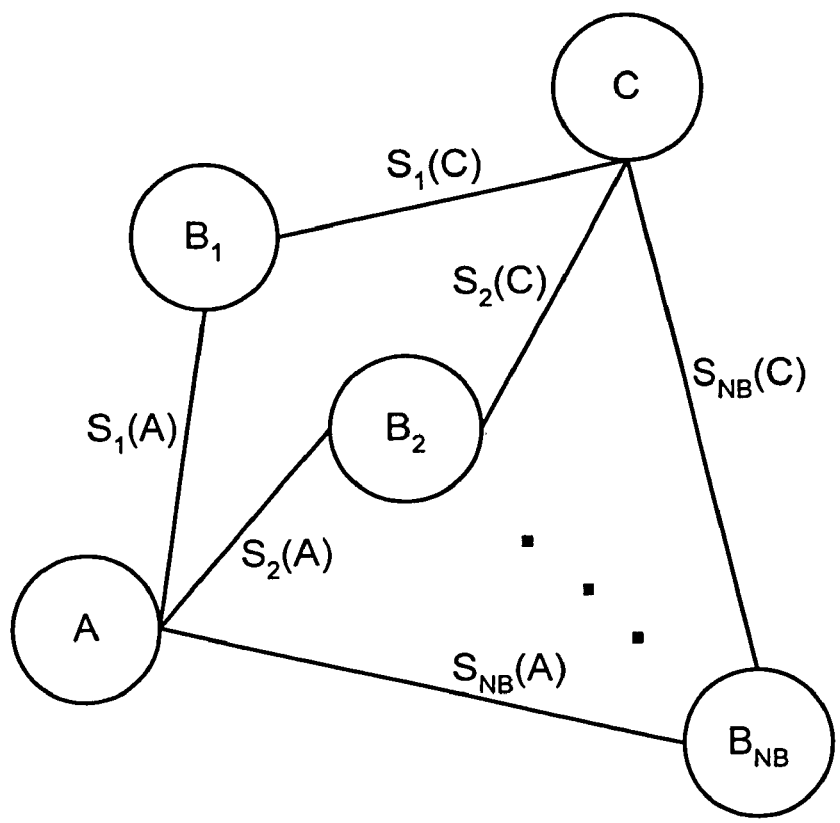

The transitive property is illustrated conceptually in FIGS. 2A and 2B. Referring to FIG. 2A, instead of directly comparing the biometric data of sample A with the biometric data of sample C, the data of samples A and C are independently compared with a third basis or reference sample B. By virtue of the transitive property, if sample A has a high score S(A) against sample B and sample C also has a high score S(C) against sample B, then there is a high likelihood (i.e. there is an increased probability) that sample A has a high score against sample C. In the present invention, the transitive property is applied to an underlying match algorithm using a plurality of basis sample elements, shown as $B_1$ to $B_{NB}$ in FIG. 2B (and contained in database $DB_B$ FIG. 1) As described in detail below, recognition may be much more rapidly established by comparing the scores S(A) of sample A with each basis element $B_1$ to $B_{NB}$ to the scores S(C) of sample C with the same basis elements, as fundamentally illustrated in FIG. 2B. In this manner, the score vectors S(A) and S(C) each provide encoded recognition information that may be used to measure nearness in a biometric vector space created by the basis elements $B_1$ to $B_{NB}$. Different recognition measures for determining the similarity or nearness of the score vector $S(A)=\{S_1(A), S_2(A), \ldots S_{NB}(A)\}^T$ and the score vector $S(C)=\{S_1(C), S_2(C), \ldots S_{NB}(C)\}^T$ can be used. For example, $$M(A, C) = \frac{1}{NB} \sum^{NB} [S_I(A) - S_I(C)]^2$$

where $\Sigma^{NB}$ denotes a sum over the basis set $DB_B$ with I=1 to NB and $S_1(A)$ refers to the raw score of sample A with the I'th basis element. Other measures which determine nearness based on, for example, Euclidean distance or Manhattan distance are also possible. Generally, the smaller the value of M(A,C), the closer encoded vectors S(A) and S(C) are in the biometric vector space created by the basis elements $B_1$ to $B_{NB}$, and the higher the probability of a match or recognition between samples A and C.

However, because the set of basis elements is a finite set, a transitive recognition measure—such as M(A,C)—that determines the similarity between the scores S(A) and S(C) does not produce optimal results for the classification or recognition of biometrics. In accordance with the present invention, transitive recognition system 100 performs a first sample space rotation, and preferably also a second recognition space rotation, on raw scores obtained from underlying recognition system 150 to provide a highly compressed encoded vector that enables rapid matching and recognition to be performed with an improved transitive measure. The method of operation of transitive system 100 is depicted in flow chart form in FIGS. 3-6 and is described below.

Figure 3:
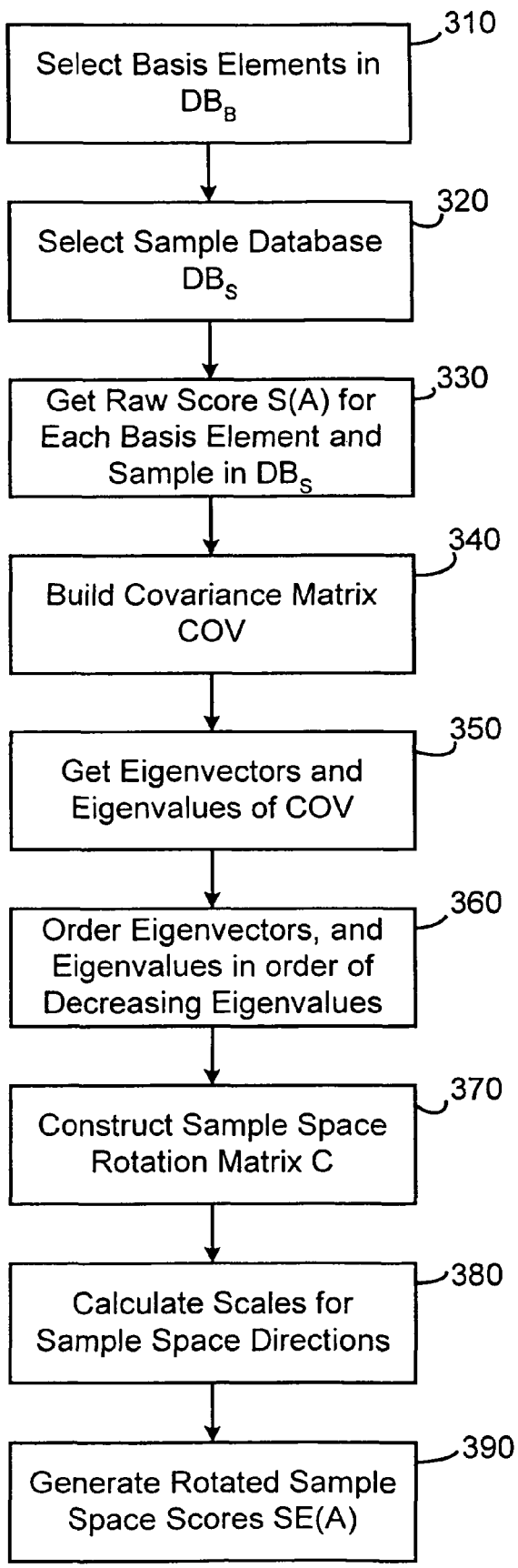
FIG. 3 is a flow chart showing a preferred method of operation of the sample space rotation module of the transitive recognition system of FIG. 1.

FIG. 3 shows a preferred method of operation of sample space rotation module 110 of transitive recognition system 100 of FIG. 1. Referring to FIG. 3, transitive system 100 must initially select the basis elements $B_1$ to $B_{NB}$ in database set $DB_B$. Each basis element $B_1$ represents the biometrics of a different individual and may be selected according to different criteria. For example, the basis set $DB_B$ may be taken from representatives of the population having the highest overlap (or scores) with non-basis probe biometric samples. On the other hand, the basis set $DB_B$ may be taken from representatives of the population having minimal overlap with each other, thereby helping to ensure that the vector space created by the basis set covers the extreme boundaries of the biometric space well. As a further alternative, the elements in the basis set $DB_B$ may be selected at random. In the specific context of face recognition, all three of the above basis constructions were attempted, and the randomly constructed basis set provided the best recognition during out-of-sample testing (i.e. testing on biometric samples not in basis set $DB_B$). As a result, a randomly selected basis set is preferably selected in step 310, at least in the case of face recognition.

However, since it is difficult to determine a truly random subset over a biometric population, there is a strong possibility, particularly for small basis sizes, that certain parts of the biometric space may be over-represented and certain parts may be under-represented. The existence of over-represented regions of the biometric space leads to over-discrimination in favor of biometric samples in the over represented space. Conversely, there is under-discrimination against biometric samples in the under-represented regions of the biometric space. As described below, in view of the inherent limitations of a finite size basis $DB_B$, transitive system 100 provides an improved transitive recognition measure that maps the "raw" scores $S(A)$ and $S(C)$ into newly constructed biometric vector spaces.

To determine such an improved measure that can be used to denote the distance between two biometric samples in biometric space, a sample database $DB_S$ is used, and so is selected at step 320 in FIG. 3. The database $DB_S$ includes NS samples, $A_1$ to $A_{NS}$, each of which is out-of-sample with respect to the basis set elements in $DB_B$ (the samples $A_1$ to $A_{NS}$ in database $DB_S$ may also be referred to as test samples). At step 330, for each basis element $B_1$ to $B_{NB}$, and each representative $A_1$ to $A_{NS}$ in database $DB_S$, the score $S(A)$ is calculated using the underlying matching algorithm. A NB×NB covariance matrix COV is constructed, as shown in step 340, where the (I, J)'th element of the matrix COV is given by $$COV_{I,J} = \frac{1}{NS^2} \sum^{NS} [S_I(A) - M_I] \cdot [S_J(A) - M_J]$$

and where $\Sigma^{NS}$ denotes a sum over $DB_S$ with A=1 to NS, and with $M_I$ (and similarly $M_J$) given by:

$$M_I = \frac{1}{NS} \sum^{NS} S_I(A)$$

It should be noted that the matrix COV is computed using out-of-sample data, i.e. the scores $S(A)$, allowing the transitive property to be exploited. Furthermore, it will be appreciated that the covariance matrix COV provides a convenient way of determining and assessing how the dispersion of the basis elements is related. However, although the covariance matrix COV is preferably used to generate sample space scores as described below, it will be appreciated that other measures of dispersion (i.e. other than variance) may also be used.

If each of the raw space basis element directions I and J, where I≠J, are completely de-correlated, then the off-diagonal elements of COV would be zero, and the I'th diagonal elements would equal the variance in the I'th basis direction (with the variance $\sigma^2$ equaling the square of the standard deviation $\sigma$). As will be appreciated, however, in the "raw" biometric vector space of $DB_B$ the basis directions I and J will generally be correlated to varying degrees. The COV matrix is real and symmetric (COV=COV$^T$) and can hence be diagonalized into a form that reveals the matrix's eigenvectors $\phi_I$ (i.e. $\phi_1$ to $\phi_{NB}$) and corresponding eigenvalues $\lambda_I$ (i.e. $\lambda_1$ to $\lambda_{NB}$), as indicated at step 350. Specifically, a linear transformation that diagonalizes COV provides a matrix of eigenvectors. The diagonalization may be accomplished by a numerical technique such as singular value decomposition or a Householder-QR (or Householder-QL) decomposition.

Since COV is real symmetric, its eigenvalues are non-negative and its eigenvectors form a complete orthogonal set. The resulting eigenvectors $\phi_I$ denote the linearly independent (or principal component) directions or modes $E_I$ in a biometric sample space $S_1$ and the eigenvalues $\lambda_I$ indicate the square of the "width" of the distribution of samples in those directions, i.e. the I'th eigenvalue represents the variance in the I'th direction. At step 360, the eigenvectors and values are ordered in terms of decreasing eigenvalue $\lambda_I$ such that $\lambda_{NB} \leq \lambda_{NB-1} \leq \ldots \leq \lambda_2 \leq \lambda_1$.

It should be noted that the raw scores $S_I(A)$ may be processed before being used to generate COV or, more generally, to construct the sample space $S_1$. For example, the scores $S_I(A)$ may each have a mean subtracted from them to compensate for a certain condition (e.g. lighting) during the acquisition of samples. Furthermore, more than one score may be used for each person or object represented in $DB_S$.

A biometric sample space rotation matrix C is determined, at step 370, by $$C = [\phi_1 \phi_2 \ldots \phi_{NB}]$$

where C maps between the raw biometric space and the biometric sample space $S_1$. The rotation matrix C denotes the most important directions or modes $E_I$ in biometric $S_1$ space, i.e. the directions that best separate one sample from another and hence provide a maximal discrimination between biometric samples. At step 380, a scale for each direction $E_I$ in the biometric sample space $S_1$ is also determined and given by $$D_I = (\lambda_I)^{1/2} \quad D_{NB} \leq D_{NB-1} \leq \ldots \leq D_2 \leq D_1$$

with $D_I$ representing the standard deviation in the linear independent direction $E_I$. Again as indicated, the sample space $S_1$ is ordered with the largest scales $D_I$ indexed before the smaller scales. The scales $D_I$ are used to normalize the effect of each direction $E_I$ in a sample space score generated at step 390 as:

$$SE_I(A) = \frac{1}{D_I} \sum^{NB} C \cdot S_J(A)$$

where $\Sigma^{NB}$ denotes a sum over the initial basis set $DB_B$ with J=1 to NB, and $SE_I(A)$ refers to the sample space score of sample A with the $E_1$ direction or mode in the biometric sample space (i.e., rotated from the raw biometric space). It will be appreciated that due to the normalization with the scales $D_1$, the entire biometric sample space $S_1$ becomes a normalized hyper-sphere.

Figure 4:
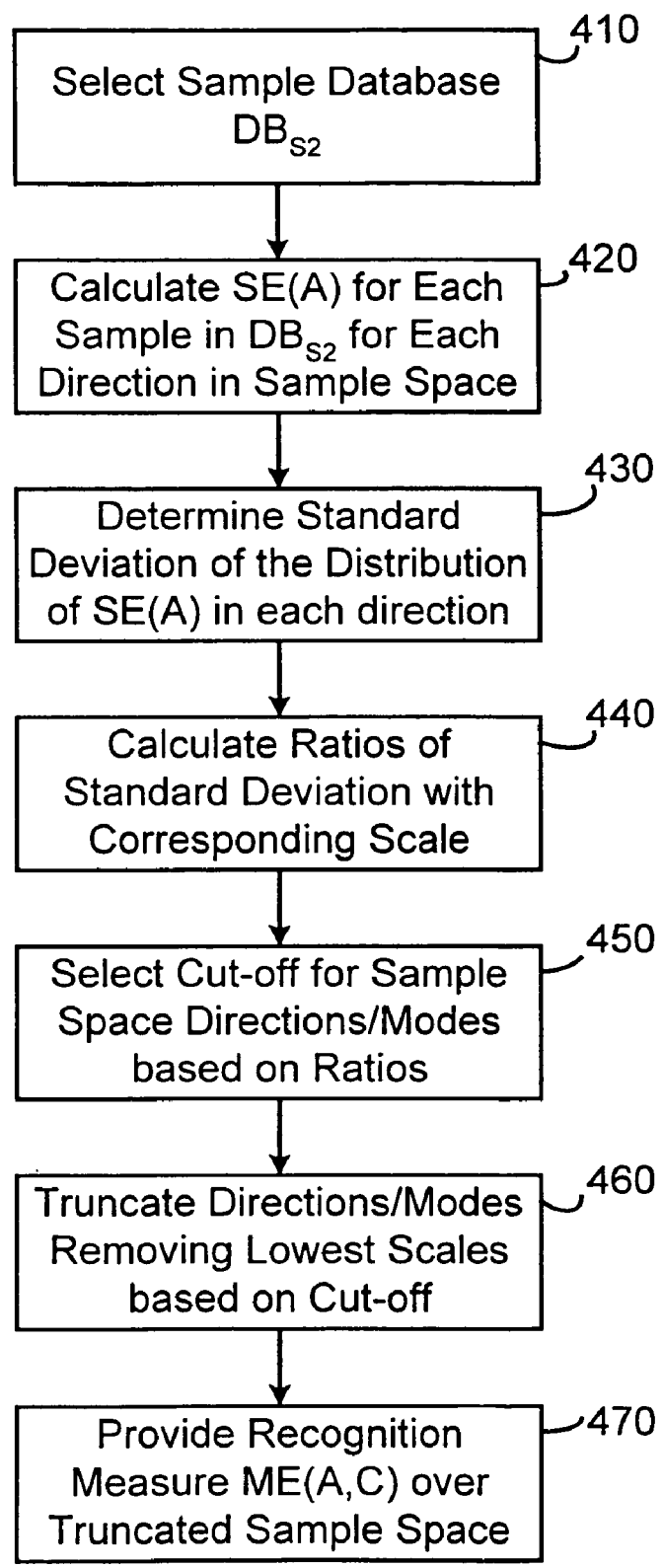
FIG. 4 is a flow chart showing a preferred method of operation of the sample space truncation and measure module of the transitive recognition system of FIG. 1.

Small $D_1$ represent less relevant directions $E_1$ in which linear combinations of the scores in the basis have the least ability to discriminate between samples in the database $DB_S$. These low scale directions may also be thought of as "finetuned" directions to the database $DB_S$, and therefore are not suitable for biometric discrimination. As a result, the recognition method and system of the present invention preferably truncates the biometric sample space $S_1$ by eliminating modes $E_1$ with small scales $D_1$, before generating a transitive sample space measure ME(A,C). FIG. 4 illustrates, in flow chart form, a preferred method of operation of sample space truncation and measure module 120 in transitive recognition system 100. To determine an appropriate cutoff in $E_1$ modes, a second out-of-sample database $DB_{S2}$ may be used (i.e. $DB_{S2}$ is out-of-sample with respect to both $DB_B$ and $DB_S$). Database $DB_{S2}$ is therefore selected at step 410. The sample space scores $SE_1(A)$ for each sample A in $DB_{S2}$ are calculated for each mode $E_1$ of the biometric sample space $S_1$ in step 420. At step 430, the standard deviation $\sigma S2_1$ of the distribution of the scores for each mode is then determined, at step 430, and divided by the corresponding $D_1$ at step 440. If the vector rotation for that mode generalizes, the ratio $\sigma S2_1/D_1$ should be close to 1.0, for example from about 0.9 to 1.1. However, as this ratio approaches 1.3-1.4, the vector analysis clearly fails for the out of sample data in $DB_{S2}$. It will be appreciated that increases in the ratio $\sigma S2_1/D_1$ closely correspond with decreases in $D_1$ for the ordered modes $E_1$ in biometric sample space. Thus, an appropriate cut-off may be taken for sample space modes $E_1$ for which this ratio begins to exceed some value within the range 1.1 and 1.3, as indicated at step 450. In one preferred embodiment, a cut-off ratio of approximately 1.25 is selected, corresponding roughly to three standard deviations beyond the expected value of 1.0. In this manner, at step 460, a number of the $E_1$ having the lowest $D_1$ are simply truncated, based on the ratio cut-off above, from the biometric sample space $S_1$ thereby further increasing the robustness of the method and system of the present invention to out of sample biometric data (i.e. data out-of-sample with respect to both $DB_B$ and $DB_S$). The number of principal directions or modes $E_1$ remaining after truncation is denoted as NE, and an improved measure for biometric discrimination in the truncated sample space $S_1$ is given, as indicated at step 470, by $$ME(A, C) = \frac{1}{NE}\sum^{NE}[SE_I(A) - SE_I(C)]^2$$

Again, other similar (Euclidean, Manhattan, etc.) measures of the distance between biometric vectors A and C in truncated sample space can alternatively be used.

The sample space into which the rotation matrix C maps, as constructed by modules 110 and 120 in system 100, is still not optimal for performing biometric or object recognition. This is because the sample space measure ME(A,C) does not take into account the possibility that the same object or individual may undergo variations in appearance that, insofar as recognition matching is concerned, should be disregarded. As a result, transitive recognition system 100 provides for a further rotation of the sample space scores SE(A) into a recognition space $SR_1$. The recognition space $SR_1$ further takes into account the possibility that in the sample space $S_1$, there may be directions associated with changes of the same individual or object, such as a change of expression in a face, or a change of orientation or scale of a fingerprint. As indicated, these directions in sample space are or should be directions of zero measure size in recognition space. Stated another way, the recognition space $SR_1$ includes biometric sample space directions $ER_1$ that differentiate between different individuals.

Figure 5:
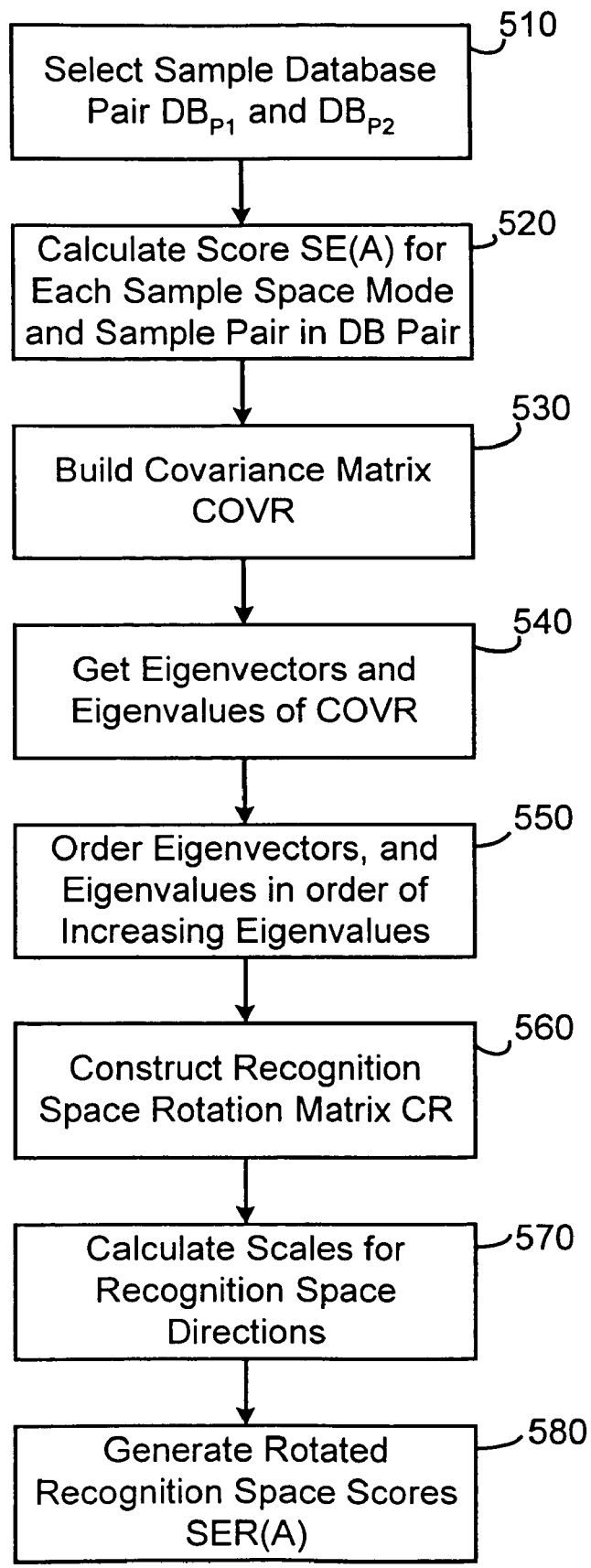
FIG. 5 is a flow chart showing a preferred method of operation of the recognition space rotation module of the transitive recognition system of FIG. 1.

A preferred method of operation of recognition space rotation module 130 is illustrated in FIG. 5. To construct the biometric recognition space $SR_1$, a database pair, defined as two databases $DB_{P1}$ and $DB_{P2}$ each having a different biometric sample of the same NP individuals, is selected at step 510. That is, the samples between databases for the same database index differ only by a re-sampling of the same individual, for example at different times, in different surroundings, and/or at different orientations. As the database entry changes in $DB_{P1}$ and $DB_{P2}$, the individual sampled changes as well. The databases $DB_{P1}$ and $DB_{P2}$ may also be referred to as common object databases. Recognition space $SR_1$ is built on biometric sample space $S_1$ by using the database pair and, in effect, identifying the directions in biometric sample space that best differentiate between individuals.

Referring to FIG. 5, at step 520, for each mode $E_1$ (i.e., in the truncated sample space modes) and each sample pair in the databases $DB_{P1}$ and $DB_{P2}$, the sample space scores $SE_1(A1)$ and $SE_1(A2)$ are calculated, where A1 and A2 are representative samples of the same individual (or object). It should be noted that the biometric sample score SE(A) (as opposed to the raw score S(A)) is used. A NE×NE covariance matrix COVR is constructed, as shown in step 530, where the (I, J)'th element of the matrix COVR is given by $$COVR_{IJ} = \frac{1}{2NP^2}\sum^{NP}[SE_I(A1) - SE_I(A2)] \cdot [SE_J(A1) - SE_J(A2)]$$

where $\Sigma^{NP}$ denotes a sum over the database pair $DB_{P1}$ and $DB_{P2}$ with A1, A2=1 to NP. The matrix COVR is again real and symmetric and can be decomposed or diagonalized into a form that reveals the matrix's eigenvectors $\phi R_1$ (i.e., $\phi R_1$ to $\phi R_{NE}$) and corresponding eigenvalues $\lambda R_1$ (i.e., $\lambda R_1$ to $\lambda R_{NE}$), as indicated at step 540. As with the diagonalization of COV, singular value decomposition or Householder-QR techniques may be used to diagonalize COVR.

The resulting eigenvectors $\phi R_1$ form a complete orthogonal set and denote the linearly independent directions $ER_1$ in biometric recognition space $SR_1$. The eigenvalues $\lambda R_1$ are non-negative and represent the variance or the square of the "width" of the distribution of samples in the directions $ER_1$. At step 550, the eigenvectors and values may be denoted or ordered in terms of increasing eigenvalue $\lambda R_1$ such that $\lambda R_1 \leq \lambda R_2 \ldots \leq \lambda R_{NE-1} \leq \lambda R_{NE}$.

At step 560, a biometric recognition space rotation matrix CR is determined, at step 560, by $$CR = [\phi R_1 \, \phi R_2 \ldots \phi R_{NE}]$$

where CR maps between the biometric sample space $S_1$ and the biometric recognition space $SR_1$. The matrix CR denotes the most important directions $ER_1$ in recognition space $SR_1$, the directions that best separate one person (or object) from another, and hence provide a maximal discrimination between individuals. At step 570, a scale $DR_1$ for each direction $ER_1$ in the biometric recognition space is determined and is given by $$DR_1 = (\lambda R_1)^{1/2} \quad DR_1 \leq DR_2 \leq \ldots \leq DR_{NE-1} \leq DR_{NE}$$

with $DR_1$ representing the standard deviation in the $ER_1$ linear independent direction in recognition space $SR_1$. The directions and scales are ordered with the smallest scales $DR_1$ indexed before the larger scales.

The input elements of the COVR matrix, $SE_1(A)$, are representatives in each sample space direction $E_1$ of distributions with a variance equal to 1 (normalized to 1 by dividing by $D_1$). As indicated, the sample space $S_1$ corresponds to a normalized hyper-sphere of "size" 1 in all sample space directions $E_1$. If the underlying algorithm used in the raw recognition score system 150 is unable to perform recognition, then the diagonalized elements of COVR (i.e. its eigenvalues $\lambda R_1$) will be approximately equal to 1, since this is the variance in the biometric sample space $S_1$, and the rotation performed by matrix CR does not affect this property. On the other hand, if the underlying raw score algorithm is able to perform recognition, then the distribution in biometric sample space $S_1$ of the difference between scores of samples of the same person (i.e. $SE_1(A1)-SE_1(A2)$) is smaller than if the samples correspond to different people. Thus, in the recognition space analysis, the space is ordered with respect to the smallest scales $DR_1$ first, since the smaller the scale, the better the direction or mode $ER_1$ is for recognition.

A rotated recognition space score is generated at step 580 as follows:

$$SER_J(A) = \Sigma^{NE} CR \cdot SE_J(A)$$

where $\Sigma^{NE}$ denotes a sum over the truncated sample space modes $E_J$ with J=1 to NE and $SER_1(A)$ refers to the recognition space score of sample A with the direction or mode $ER_1$ in the biometric recognition space.

In the alternative to constructing the recognition space $SR_1$ by calculating and diagonalizing a COVR matrix as described above, other methods and techniques may be used on the projections of sample database pairs from $DB_{P1}$ and $DB_{P2}$ on to sample space $S_1$. Furthermore, other common object databases (e.g. $DB_{P3}$, $DB_{P4}$, etc.) having additional distinct samples of the same objects or persons in $DB_{P1}$ and $DB_{P2}$ may also be used to construct recognition space. Some of these disciminant techniques are linear, such as Fisher's Linear Discriminant analysis which takes a difference between vectors in sample space $S_1$, and then applies Fisher analysis along with subsequent diagonalization techniques; while other discriminant techniques are non-linear, such as algorithms based on two or three layer neural networks. These and other suitable techniques are described by Bishop in "Neural Networks for Pattern Recognition" (Clarendon Press: Oxford, 1995), the contents of which are incorporated herein by reference.

Where the scales $DR_1$ for each direction or mode $ER_1$ in recognition space are approximately equal to 1, this is indicative of directions in which linear combinations of the scores in the recognition space basis have the least ability to perform recognition in the databases $DB_S$, $DB_{P1}$, and $DB_{P2}$. These directions may again be considered "fine-tuned" directions to the databases $DB_S$, $DB_{P1}$, and $DB_{P2}$ and should not be used for person or object discrimination. Recognition space truncation and measure module 140 in transitive system 100 therefore preferably carries out a truncation of the recognition space directions $ER_1$ before providing a transitive recognition space measure MER(A,C).

Figure 6:
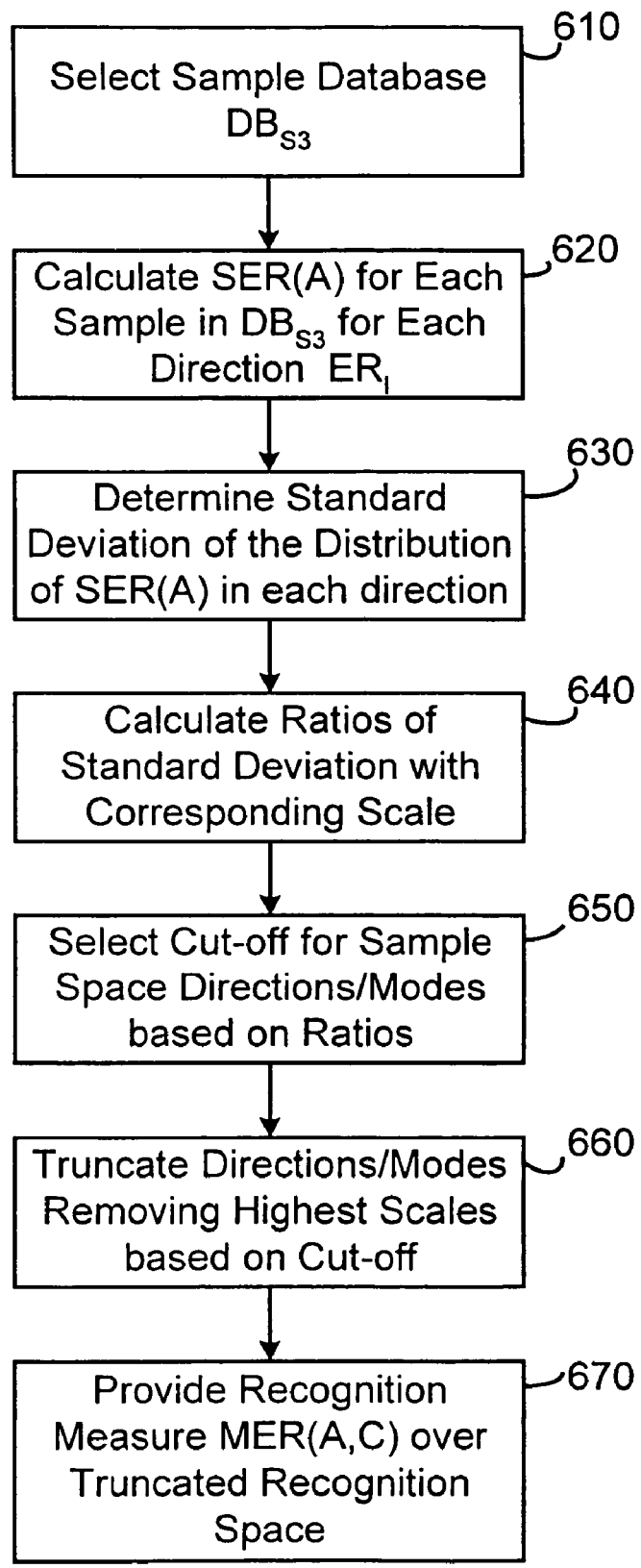
FIG. 6 is a flow chart showing a preferred method of operation of the recognition space truncation and measure module of the transitive recognition system of FIG. 1.

A preferred method of operation of module 140 is shown in FIG. 6. To determine an appropriate cutoff in modes, a third out-of-sample database $DB_{S3}$ (i.e. $DB_{S3}$ is out-of-sample with respect to $DB_B$, $DB_S$, $DB_{P1}$, $DB_{P2}$, and $DB_{S2}$) whose samples correspond to different individuals or objects than those in other databases, may be used. Such a database $DB_{S3}$ is selected at step 610. The recognition space scores $SER_1(A)$ for each sample A in $DB_{S3}$ are calculated for each mode $ER_1$ of the biometric recognition space $SR_1$ in step 620. As described above, since the samples in $DB_{S3}$ correspond to different individuals or objects than those in other databases, no recognition should occur, and ideally the scales $DR_1$ should be one. Referring back to FIG. 6, the standard deviation $\sigma S3_1$ of the distribution of the scores for each mode is then determined, at step 630, and divided by the corresponding $DR_1$ at step 640. If the vector rotation for that mode generalizes, the ratio $\sigma S3_1/DR_1$ should be close to 1.0, for example from about 0.9 to 1.1. In contrast, as this ratio approaches 1.3-1.4, the vector analysis clearly fails for the out of sample data in $DB_{S2}$. It will be appreciated that in this case, increases in the ratio $\sigma S3_1/DR_1$ considerably beyond 1.0 closely correspond with increases in $DR_1$ considerably beyond 1.0 for the modes $ER_1$ in biometric sample space.

Thus, an appropriate cut-off may again be taken for recognition space modes $ER_1$ for which this ratio begins to exceed some value within the range 1.1 and 1.3, as indicated at step 650. Again, in a preferred embodiment, a cut-off ratio of approximately 1.25 may be selected, corresponding to about three standard deviations beyond the expected value of 1.0. In this manner, at step 660, a number of the $ER_1$ generally having the highest $D_1$ are truncated, based on this ratio cut-off, from the biometric sample space $SR_1$. As a result, the robustness of the method and system of the present invention to out-of-sample biometric data (i.e. data out-of-sample with respect to both $DB_B$ and $DB_S$) is further increased. The number of principal directions or modes $ER_1$ remaining in the truncated recognition space $SR_1$ is denoted as NER. An improved measure for biometric discrimination in the truncated recognition space $SR_1$ is given, as indicated at step 670, by constructing:

$$MER(A, C) = \frac{1}{NER} \sum^{NER} RF_I \cdot [SER_I(A) - SER_I(C)]^2$$

where, for example, $$RF_I = \frac{1}{DR_I^2} - 1 = \frac{1}{\lambda R_I} - 1$$

The recognition factor $RF_1$ is used to ensure that, as the mode $ER_1$ has lessening recognition capability, $DR_1$ approaches 1, so that the mode $ER_1$ does not contribute to the measure. The recognition factor $RF_1$ is one of many possibilities, and generally $RF_1$ only needs to ensure that modes $ER_1$ that are unable to perform recognition do not contribute, and modes $ER_1$ that contribute strongly to recognition receive more weight. The above implementation of recognition factor $RF_1$ provides one such simple solution. In addition, other measures of the nearness of points or vectors SER(A) and SER(C)) in recognition space $SR_1$ can alternatively be constructed.

The recognition space measure MER(A,C) is a main result of the transitivity principles outlined above. The construction of the recognition space $SR_1$ (and the sample space $S_1$) provides a vector space in which encoded biometric or object sample vectors SER can exist. The encoded vectors are generated by taking the underlying or core recognition algorithm in system 150 and the database $DB_B$ of basis elements to first provide the raw scores $S(A) = \{S_1(A), S_2(A), \ldots S_{NB}(A)\}^T$ of a probe or test sample A. The vector S(A) is then mapped or rotated into the sample space scores $SE(A)=\{SE_1(A), SE_2(A), \ldots SE_{NE}(A)\}^T$ to provide a vector encoded in sample space. Preferably, the sample space encoded vector SE(A) is then further mapped or rotated into the recognition space scores $SER(A)=\{SER_1(A), SER_2(A), \ldots SER_{NER}(A)\}^T$. Thus, the distance or nearness between any two recognition space encoded vectors SER(A) and SER(C) can be measured with a suitable measure MER(SER(A),SER(C)) which can equivalently be given as MER(A,C) as described above. When it is desired to match a probe person (or object) with one of a number of known persons (or objects), the encoded score of a known person that provides the lowest measure score of MER(A,C) generally determines a match or recognition.

Transitivity matching in this manner provides a means for pre-encoding biometric match information from each set of raw biometric (or object) sample data, such as a face image or a fingerprint. With the transitive recognition method and system of the present invention, the time required for the recognition system to perform matching is dramatically reduced, i.e., the time required to generate a recognition space encoded vector SER(A) for a probe sample A and compare it, using MER(SER(A),SER(C)), to other similarly encoded known samples C is dramatically reduced. In addition, the size of the encoded biometric vectors or templates SER(A) is also significantly reduced compared to the size of raw score vectors S(A).

In effect, the sample space $S_1$ is a linear approximation to the non-linear recognition properties of the underlying core algorithm in system 150, however the recognition space $SR_1$ has "knowledge" of recognition beyond that provided by the initial algorithm in system 150. Although the transitive system 100 preferably constructs (and encodes object or biometric vectors in) recognition space $SR_1$, in some cases constructing (and encoding vectors in) only the sample space $S_1$ may be beneficial. For example, this may be the case where object recognition is being performed on objects that do not generally vary over time. Also, while truncating each of the sample and recognition spaces is preferred, truncation is not required to obtain the benefits and advantages of the present invention. The major advantage of more rapidly matching objects is due largely to the pre-calculation of scores and the exploitation of the transitive property.

The sample space may be populated via any reasonable score generator, and there are no special requirements for the underlying score generation algorithm in system 150. For example, most, if not all, face recognition algorithms can be used to provide raw score inputs to transitive system 100 of the present invention. Similarly, most imaging based fingerprint algorithms may also be used to provide raw score inputs to transitive system 100. Furthermore, the speed of many other biometric and object recognition algorithms may also be significantly improved by the transitive system and method of the invention. The principal criterion is that the raw score algorithm in the underlying recognition system 150 must be able discriminate between individuals or objects, as required by the application.

In general, the accuracy of the measure MER(A,C) of the present invention follows the accuracy of the underlying algorithm in system 150, as the number of elements in the basis database $DB_B$ becomes sufficiently large. For example, in a face recognition application, the basis database $DB_B$ preferably includes 200 or more basis samples. As a result, there is little or no loss of accuracy with respect to the underlying match algorithm in system 150. Furthermore, in the process of constructing the recognition space $SR_1$, recognition data is provided by way of the database pairs $DB_{P1}$ and $DB_{P2}$. This additional data may serve to improve the accuracy of the initial core algorithm.

In one preferred embodiment of the present invention, for a face recognition application, raw recognition score system 150 includes components of the FaceIt® software developer kit available from Visionics Corporation of Jersey City, N.J. For example, system 150 may include the function CFACE::LoadFace of the FaceIt® developer kit which generates face templates or faceprints from video images using a Local Feature Analysis algorithm. In addition, system 150 may include the function CFACE::IdentifyPerson of the FaceIt® developer kit which generates a representation, i.e., a digital faceprint, for faces and performs matching between different representations to generate a raw matching score.

In a specific example of such a face recognition implementation, the following database sizes were used: $DB_B$ included 200 samples of different people; and $DB_S$, defining biometric sample space, contained 1,000 samples of different people. The truncated biometric sample space included the first 128 modes $E_1$ (i.e., the 128 modes having the largest $D_1$). The database pair $DB_{P1}$ and $DB_{P2}$ included sample pairs of 1000 individuals, and the truncated biometric recognition space included the first 80 modes $ER_1$ (i.e., the 80 modes having the largest $DR_1$). In this implementation and with these parameters, the time required to encode and match a biometric sample is roughly one second, i.e., 200 matches per second for a raw score vector S(A) on a 500 MHZ Pentium III computer system.

After construction of the SER(A) vector, which in its final form is 80 dimensional, the SER(A) vector may be projected onto a byte scale for each of its 80 components. The byte scale ranges from 0-255 and preferably corresponds to 6 $DR_1$ lengths. All rotations and divisions are pre-computed into each vector SER(A). Using system 100 of the present invention, the transitive recognition space measure calculation MER(A,C) is carried out at a rate of 47 million per minute on the same computer system. This represents a many-fold improvement in recognition or matching speed. In addition, the template used for the initial matching S(A) has a size 3.5 KBytes. The final template size of SER(A) is reduced to 80 Bytes. As will be appreciated, these dramatic improvements in speed and storage requirements are highly advantageous.

While the invention has been described in conjunction with specific embodiments, it is evident that numerous alternatives, modifications, and variations will be apparent to those skilled in the art in light of the foregoing description.

What is claimed is:

1. A method of constructing a vector space in which a data sample relating to an object may be encoded, comprising:
   providing a raw matching score between each of a plurality of basis sample elements and each of a plurality of data samples in a first sample database using a score generator, the data samples in the first sample database being out-of-sample with respect to the basis sample elements;
   constructing a sample space from the raw matching scores using a sample space construction module implemented on a computer, the sample space being defined by a basis set of sample space modes and structured such that a similarity between a data sample relating to an object encoded in the sample space and one or more of the data samples in the first sample database can be identified by determining a matching score between the data sample relating to the object and one or more of the plurality of basis sample elements.

2. The method of claim 1 wherein constructing the sample space comprises: generating a covariance matrix for the basis sample elements from the raw matching scores; and determining the eigenvectors and eigenvalues of the covariance matrix, the eigenvectors specifying the sample space modes.

3. The method of claim 2 further comprising: generating a rotation matrix, based on the eigenvectors of the covariance matrix, the rotation matrix mapping raw matching scores into sample space scores.

4. The method of claim 3 further comprising: truncating the sample space by eliminating a subset of the sample space modes, the eliminated modes generally having the lowest eigenvalues.

5. The method of claim 4 further comprising:
providing a raw matching score between said data sample and each of the plurality of basis sample elements; and
mapping the raw matching scores of said data sample into truncated sample space scores.

6. The method of claim 5 further comprising:
encoding known data samples into truncated sample space scores in the truncated sample space, and storing the truncated sample space scores in a reference database;
encoding the data sample as a probe data sample into truncated sample space scores in the truncated sample space;
measuring the distance between the truncated sample space scores for the probe data sample and each known data sample in the truncated sample space; and
determining which encoded known data sample is nearest to the encoded probe data sample in the truncated sample space.

7. The method of claim 1 further comprising selecting the plurality of basis sample elements at random.

8. The method of claim 1 further comprising:
providing a raw matching score between said data sample and each of the plurality of basis sample elements; and
mapping the raw matching scores of said data sample into sample space scores.

9. The method of claim 8 further comprising:
encoding known data samples into sample space scores in the sample space, and storing the sample space scores in a reference database;
encoding the data sample as a probe data sample into sample space scores in the sample space;
measuring the distance between the sample space scores for the probe data sample and each known data sample in the sample space; and
determining which encoded known data sample is nearest to the encoded probe data sample in the sample space.

10. The method of claim 1 wherein the objects are persons, the data samples are face templates, and the method is used to perform face recognition.

11. The method of claim 1 wherein the objects are persons, the data samples represent fingerprints of the persons, and the method is used to perform fingerprint recognition.

12. For use in object recognition, a space construction and encoding system comprising:
a score generator configured to generate a raw matching score between a basis sample element and a data sample; and
a computer including a sample space construction module configured to receive a data sample relating to an object to be encoded, a plurality of basis sample elements, and a plurality of data samples in a first sample database, the samples in the first sample database being out-of-sample with respect to the basis samples; the sample space construction module configured to use a raw matching score between each basis element and each of the plurality of data samples in the first sample database, to construct a sample space from the raw matching scores, the sample space being defined by a basis set of sample space modes, such that when a data sample relating to an object is encoded in the sample space, a similarity between the data sample relating to the object and one or more of the data samples in the first sample database may be identified by determining a matching score between the data sample relating to the object and one or more of the plurality of basis sample elements.

13. The system of claim 12 wherein the sample space construction module is configured to generate a covariance matrix for the basis sample elements from the raw matching scores, and to determine the eigenvectors and eigenvalues of the covariance matrix, the eigenvectors specifying the sample space modes.

14. The system of claim 13 wherein the sample space construction module is further configured to generate a rotation matrix, based on the eigenvectors of the covariance matrix, the rotation matrix mapping raw matching scores into sample space scores.

15. The system of claim 14 further comprising a sample space truncation module configured to truncate the sample space by eliminating a subset of the sample space modes, the eliminated modes generally having the lowest eigenvalues.

16. The system of claim 12 wherein the plurality of basis sample elements are selected at random.

17. The system of claim 12 wherein the objects are persons, the data samples represent faces of the persons, and the system is used to perform face recognition.

18. The system of claim 12 wherein the objects are persons, the data samples represent fingerprints of the persons, and the system is used to perform fingerprint recognition.

19. A computer program product, residing on a non-transitory computer readable medium, comprising instructions operable to cause a processor to perform the following operations in constructing a vector space in which a data sample relating to an object is encoded:
providing a raw matching score between each of a plurality of basis sample elements and each of a plurality of data samples in a first sample database, the data samples in the first sample database being out-of-sample with respect to the basis sample elements; and
constructing a sample space from the raw matching scores using a sample space construction module, the sample space being defined by a basis set of sample space modes such that when the data sample relating to an object is encoded in the sample space, a similarity between the data sample relating to the object and one or more of the data samples in the first sample database may be identified by determining a matching score between the data sample relating to the object and one or more of the plurality of basis sample elements.

* * * * *